United States Patent [19]

Marsland, Jr. et al.

[11] 3,818,085
[45] June 18, 1974

[54] PRESS METHOD OF MAKING EXPANDED THERMOPLASTIC SHEET

[75] Inventors: John E. Marsland, Jr.; Raymond J. Malinowski, both of St. Joseph, Ind.

[73] Assignee: Uniroyal Inc., New York, N.Y.

[22] Filed: Sept. 21, 1971

[21] Appl. No.: 182,442

[52] U.S. Cl. ............... 264/45, 156/79, 156/580, 161/161, 264/54, 264/55, 264/293, 425/407
[51] Int. Cl. ................ B29c 3/00, B29d 27/00
[58] Field of Search ........... 264/45, 54, 55, 293; 161/161; 156/79, 580; 425/407

[56] References Cited
UNITED STATES PATENTS

| | | | |
|---|---|---|---|
| 2,247,337 | 6/1941 | Raflovich | 264/45 |
| 2,694,871 | 11/1954 | Rollman | 264/45 X |
| 2,763,897 | 9/1956 | Gates et al. | 264/55 |
| 2,769,205 | 11/1956 | Pfleumer | 264/55 |
| 3,386,878 | 6/1968 | Pooley | 264/54 X |

FOREIGN PATENTS OR APPLICATIONS

| 744,165 | 2/1956 | Great Britain | 264/54 |
|---|---|---|---|

*Primary Examiner*—Philip E. Anderson
*Attorney, Agent, or Firm*—Salvatore C. Mitri, Esq.

[57] ABSTRACT

The invention is a novel method of making an expanded thermoplastic sheet, typified by rigid sheets having an expanded ABS resinous core and unexpanded thermoplastic facing sheets integrally bonded thereto, such as are shown in U. S. Pat. No. 3,206,354.

The method involves clamping sheet thermoplastic material, at least a portion of which is made from expandable thermoplastic material containing a chemical flowing agent, between two press platens extending over a frame mold member thinner than the plastic material within which the thermoplastic material is positioned, heating the thermoplastic material while applying high clamping pressure thereto by means of the press platens to accomplish fusion of the thermoplastic, expulsion of air, consolidation of the thermoplastic material into a fusion-bonded integral sheet and decomposition of the blowing agent, then relieving the clamping pressure in a controlled manner and continuing to apply heat so as to expand the sheet while maintaining low but positive contacting pressure between the sheet and the opening platens until the final desired thickness is achieved, and then, while holding the platens at this thickness opening, cooling the expanded sheet.

7 Claims, 6 Drawing Figures

INVENTORS
J. E. MARSLAND
R. J. MALINOWSKI

Robert J. Patterson
ATTORNEY

INVENTORS
J. E. MARSLAND
BY R. J. MALINOWSKI
Robert J. Patterson
ATTORNEY

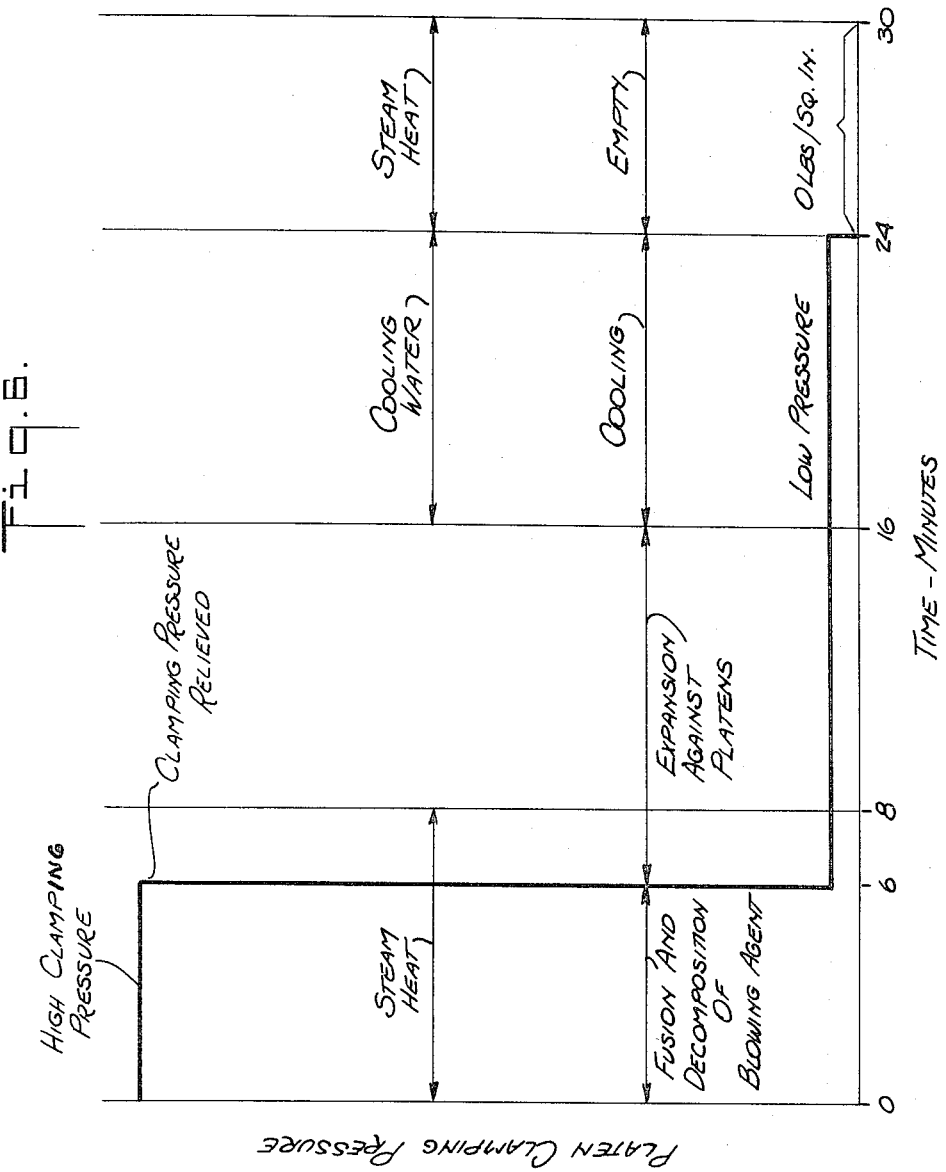

PRESS METHOD OF MAKING EXPANDED THERMOPLASTIC SHEET

DESCRIPTION OF THE PRIOR ART

Expanded ABS (acrylonitrile-butadiene-styrene) resinous laminates having an expanded ABS resinous core sandwiched between unexpanded thermoplastic sheet materials integrally bonded thereto have long been known. Methods for the production of such materials, which are usually rigid and heat-formable (as by the techniques known as thermoforming, particularly vacuum forming, wherein the heated sheet is drawn into a desired three-dimensional shape), are shown for example in U.S. Pat. Nos. to Martin et al., 3,041,220 (1962), Kohrn et al., 3,070,817 (1963), Pooley 3,206,354 (1965), Callum 3,356,560 (1967), Pooley 3,386,878 (1968) and Folsom et al. 3,463,687 (1969). These materials have generally been made by the lamination of multiple sheets of so-called "gum plastic" materials, particularly ABS resinous materials such as the original ABS resin materials described in U.S. Pat. Nos. 2,439,202 (1948) and 2,600,024 (1952) or the later-developed ABS graft copolymer resins made by grafting styrene and acrylonitrile monomers on polybutadiene rubber or butadiene-styrene copolymer rubber, almost invariably used in admixture with additional separately prepared styrene-acrylonitrile resinous copolymer, such graft copolymer resinous materials being made according to U.S. Pat. Nos. to Childers et al. 2,820,773 (1958) and Calvert 3,238,275 (1966).

Typically laminates of this type are made from one or more core layers of an ABS resinous composition containing a heat-decomposable chemical blowing agent, one or more so-called "substrate" layers of such a composition containing no blowing agent positioned on both sides of the core layer, and one or more layers of a so-called "skin" composition positioned over both layers of substrate sheet material. In common commercial practice, a lay-up of the sheets is placed on a flat pan and is covered over with a rubber sheet (known as a "vacuum blanket") with the edges of the latter sheet extending beyond the edges of the stacked or plied sheets. The assembly of pan, lay-up and vacuum blanket is then placed in a vulcanizer with vacuum being applied between the pan and the undersurface of the overlying rubber sheet. The vulcanizer is thereafter brought to high temperature and high pressure, sufficient to effect fusion of the plied layers of skin stock, substrate stock and core stock into one integral mass, with some, but limited, decomposition of the blowing agent in the core layer. Thus the total thickness of the plied-up mass increases somewhat in the vulcanizer. After a suitable length of time the vulcanizer is cooled, the pressure removed, and the cooled, fused laminate is removed. To thermoform the sheet it is thereafter placed in a hot air oven where it is raised to a temperature sufficient to decompose further the blowing agent present and to soften the resinous composition sufficiently to allow expansion of the laminate to its full thickness. This expansion is carried out under conditions allowing free expansion with no confinement by any surface or restraining influence. The expanded sheet, after being heated to a suitable temperature, is then removed from the oven in which it has been free-blown, and is formed by vacuum means, with or without the assistance of a forming plug, over, or into, a mold or form of the desired shape. Products made by this process generally have an undesirably irregular surface with high points and depressions and may vary widely in cell structure. The productivity of this process is low, labor costs are high, scrap costs are high, and the product does not give the fine conformance to details often required for example in the production of a so-called "engine cover" used for insulating the cab of a truck from the heat and noise of a motor placed in the floor of the cab. Such engine covers are often formed with spaced reinforcing corrugations and with prior art ABS rigid laminates the accuracy of reproduction of detail of the mold leaves much to be desired. In addition, undesirable non-uniformity of further expansion during thermoforming operations is a serious problem with sheets made in this way.

The techniques for making expanded laminates shown in all relevant patents known to the present inventors all involve free expansion of the fused sheet. Such free expansion almost invariably presents the serious drawbacks that it is three-dimensional expansion and it is impossible to predict, with a reasonable degree of accuracy, the dimensions of the final expanded article. These considerations apply to U.S. Pat. Nos. 3,041,220; 3,070,817; 3,206,354; 3,356,560; 3,386,878; and 3,463,687. This is true whether the initial plying up, fusion and blowing agent decomposition be performed in a conventional vulcanizer or in a hydraulic press.

U.S. Pat. No. 3,463,687 discloses a method of making laminates of the type under discussion wherein a sandwich of blowable core material between impervious thermoplastic sheets is heated under pressure in a platen press to a temperature sufficient to bond the several plies into an integral laminate but below the activation temperature of the blowing agent. The resulting laminate is then heated while placed between the platens of a press (such as the same press) which are spaced apart by a distance equal to 1.5 to 3 times the thickness of the laminate to effect decomposition of the blowing agent and expansion of the sheet into contact with the platens. This method does not have many of the advantages (detailed below) of the method of the present invention. Not only is the method of Pat. No. 3,463,687 very different from the method of the present invention but the specific gravities of the products of the instant invention are much lower than those mentioned in this patent.

U.S. Pat. No. 2,452,999 shows a method very different from the present invention. In this patent uncured thin sheets of thermoplastic rubber-resin material containing a blowing agent and a vulcanizing agent are plied-up to form a sheet which is then preheated in a heated platen press to cause union of the sheets and formation of minute closed cells within the interior of the sheet and partial vulcanization while the heat of the platens imparts a smooth surface to each face. After the sheet has been in the heated platen press for a few minutes it is removed and cooled quickly to keep it from blowing appreciably. The resulting sheet is then drawn hot into a receptacle.

U.S. Pat. Nos. 2,628,945; 2,763,897 and 2,769,205 show methods of making blown polymeric materials which do not resemble the present invention. Pat. No. 2,628,945 shows placing a polymeric material compounded with cyclic ethylene carbonate as a blowing agent in a steel cylinder, heating the mass to decompose the blowing agent while tightly confining it with a close fitting piston, then allowing the piston to rise as the composition expands, and then cooling while the pressure is maintained. Patent 2,763,897 shows heating under positive pressure a vulcanizable rubber mixture containing a blowing agent, a vulcanizing agent and a vulcanizing accelerator, the latter two inducing vulcanization only at a temperature above the decomposition temperature of the blowing agent, to a temperature above the decomposition temperature of the blowing agent but below the vulcanization temperature of the curable mixture, this step being carried out in a plunger type mold under pressure of the plunger; the pressure is then gradually released to allow the stock to expand to the desired density or volume; the expanded stock is then vulcanized; the method of this patent is very dissimilar from that of the present invention. Pat. No. 2,769,205 is very similar in its teachings to 2,763,897 and likewise is concerned with making closed cell cellular rubber. None of these patents shows the features of the present invention by which the stock positioned within a larger frame member is clamped tightly under high pressure at the outset after which heat is applied and the stock is compressed until the surrounding frame is tightly clamped under high pressure to form a closed mold space to effect fusion of the plastic, consolidation thereof into an integral mass and decomposition of the blowing agent to liberate gas which is held under confinement within the mass in the form of minute bubbles and/or dissolved in the mass, followed by relieving clamping pressure and expanding against the press platens, locking the platens and cooling. Furthermore none of these patents is concerned with making a product analogous to a rigid expanded thermoplastic resinous laminate, manufacture of which has up until the present invention been carried out by techniques wholly unlike that of the instant invention and wholly foreign to the teachings of these patents.

SUMMARY OF THE INVENTION

The invention is a method of making an expanded thermoplastic sheet, typically having an expanded core and integrally bonded non-expanded thermoplastic surface layers. The method comprises positioning the ply or plies of thermoplastic material from which the sheet is to be formed within a frame member which is slightly larger than the ply or plies to permit the thermoplastic to be squeezed laterally during fusion. The ply or plies from which the expanded portion of the sheet is to be formed contain a chemical blowing agent. The frame member has a thickness which is less than the initial thickness of the ply or the assembly of plies and must be capable of resisting press clamping pressure. The resulting assembly of plastic material and frame member is clamped between two press platens which typically are flat and parallel and so dimensioned as to extend over at least a portion of the frame member around its entire periphery. The resulting assembly is then heated, while continuing to exert platen clamping pressure on the ply or plies of thermoplastic material, to a temperature sufficiently high to cause fusion of the ply or plies and decomposition of the blowing atent. The clamping pressure is then relieved in a controlled manner and heat is applied to the sheet to effect expansion thereof while maintaining positive contacting pressure between the expanding sheet and the opening platens throughout the expansion until the desired thickness of the sheet is achieved. The expanded sheet is then cooled while maintaining the platen separation.

An essential feature of the method of the invention is that, from the instant when relief of platen clamping pressure is begun until the expanded sheet has been cooled sufficiently to retain its dimensions upon removal into ambient conditions, no "daylight," i.e. free space, is ever permitted to exist between the thermoplastic sheet and the means which confines it on both faces; typically such confining means comprise on each side of the sheet a grain or other surface-imparting plate, a metal plate outside such a plate and the adjacent platen of the press.

BRIEF DESCRIPTION OF THE DRAWINGS

In the accompanying drawings, which portray the sequential steps of a typical embodiment of the invention:

FIG. 6 is a diagrammatic representation of a typical processing cycle of the invention, showing the sequential steps in the cycle, the timing for the method steps and for the admission of superheated steam and cooling water to the conduits provided in the platens of the press, and in a general way (by the heavy black line) the variation in platen clamping pressure exerted on the plastic material during the cycle.

DESCRIPTION OF THE PREFERRED EMBODIMENTS

The accompanying drawings portray a specific embodiment of the invention wherein an expanded thermoplastic sheet is prepared from four plies of thermoplastic material, such as ABS resinous material, which contain a chemical blowing agent typified by azodicarbonamide (although any other suitable chemical blowing agent can be used), sandwiched between eight layers of non-expandable thermoplastic material compatible with the material of the four plies already mentioned, such as ABS resinous material. As is common practice in this art, the plies are made in advance by compounding the thermoplastic materials with other conventional ingredients and forming the compounds into sheets of uniform thickness as by calendering or extrusion, these operations being carried out at suitably selected temperatures which in the case of materials containing a chemical blowing agent are below its decomposition temperature.

Figure 1:
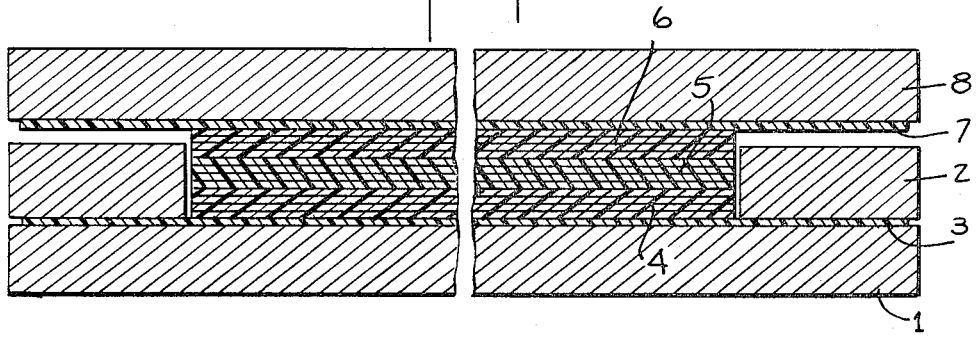
FIG. 1 shows the preparation of the assembly of plies of thermoplastic material, some of which contain blowing agent, and the frame member which constitutes part of the mold, together with grain plates and confining plates.

Referring now to FIG. 1 of the drawings, a plied-up thermoplastic assembly is prepared on a suitable confining plate 1, typically made of aluminum, upon which is positioned frame member 2 which has a hickness less than the initial thickness of the lay-up of plies of thermoplastic material and is capable of resisting press clamping pressure. Frame member 2 is generally made of metal such as aluminum. A grain plate or other texturing element 3 is first placed on plate 1. Four thermoplastic plies 4, which are to form one surface of the resulting sheet are then put in position as shown. These plies 4 do not contain a blowing agent and therefore form a solid surface layer. Above plies 4 are placed four plies 5 which contain a chemical blowing agent in undecomposed form. Above plies 5 are placed four plies 6 of unexpandable thermoplastic material. Plies 6 are generally, although not necessarily, of the same composition as plies 4. Above plies 6 is placed another grain plate or texturing element 7. A top confining plate 8, typically like plate 1, is placed across the assembly.

Either or both of elements 3 and 7 can be replaced with a perfectly smooth film of suitably heat-resistant plastic material such as polyester in order to impart a high gloss or can take the form of a sheet of woven textile, e.g. nylon, which imparts a fabric-simulating pattern. Either of elements 3 and 7 can, if desired, be eliminated altogether but in that event a coating of a suitable release agent of known type should be applied to the surface of the adjacent metal plate 1 or 8 to prevent sticking of the thermoplastic thereto.

It will be noted from FIG. 1 that the initial vertical thickness of the thermoplastic ply lay-up is greater than the vertical thickness of frame 2. The purpose of this is to cause high clamping pressure to be exerted on the plies themselves before the clamping pressure is exerted on frame 2. This ensures expulsion of entrapped air and consolidation of the plies into an integral thermoplastic mass by fusion during the subsequent steps of the process.

It will also be noted that the plies 4, 5 and 6 are somewhat smaller in area than the open area of the frame member 2. The free space between the inner surface of frame 2 and the stack of plies serves to receive thermoplastic material squeezed laterally during the clamping and fusion steps hereinafter described, thus insuring consolidation into an integral mass. The volume of this free space should be more than sufficient to receive such laterally squeezed thermoplastic so that the finished expanded sheet does not touch or adhere to the inner wall of frame 2 over the entire surface of such wall. In some cases, there may be no contact at all of the finished sheet with the inner wall. Normally, however, there is some contact between the edge of the expanded sheet and the inner wall of the frame along the lower portion of the wall. As will be obvious, the inner wall of frame 2 can be coated with a release agent to prevent adhesion of the thermoplastic sheet thereto.

Figure 2:
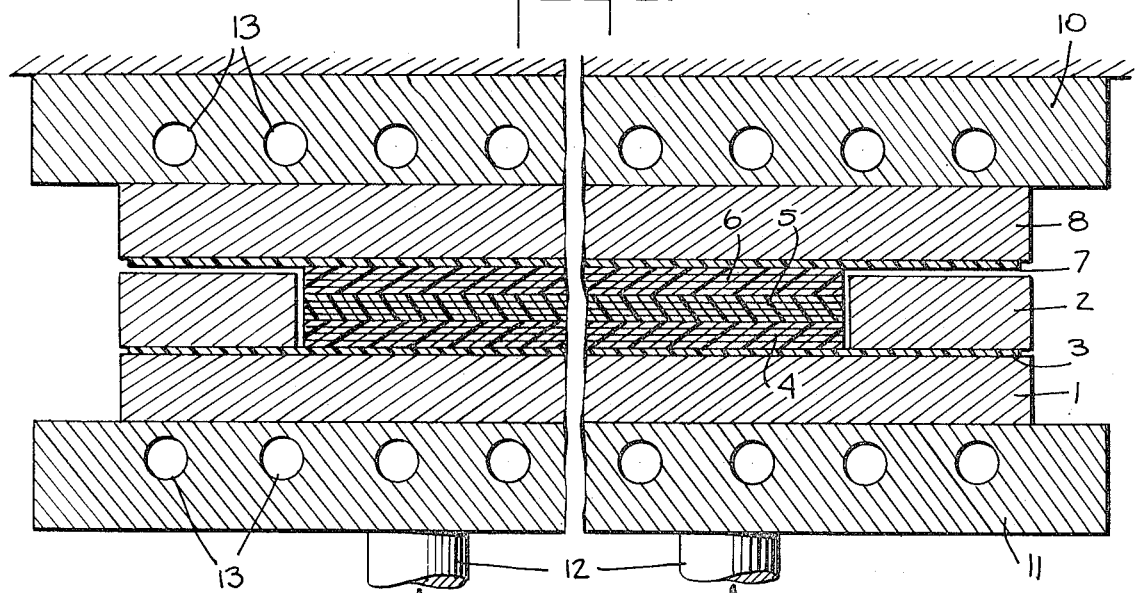
FIG. 2 shows the assembly of FIG. 1 after it has been placed between two press platens and after high clamping pressure has been applied on the stack of thermoplastic plies.

The assembly of FIG. 1 is usually separately prepared in advance of placement in the press in order to increase the productivity of the equipment. This assembly is then placed (FIG. 2) between fixed upper platen 10 and movable lower platen 11 of a conventional hydraulic press. Platen 11 is operated by conventional hydraulic piston-cylinder arrangements embodying rams indicated by reference numeral 12. (The upwardly directed arrows applied to rams 12 in FIG. 2 indicate that high clamping pressure is being applied during the step portrayed in that figure.) After placement of the assembly of FIG. 1 between platens 10 and 11 the platens are clamped as shown in FIG. 2. It will be seen that in FIG. 2 the ply lay-up is firmly clamped between plates 1 and 8 but there is some clearance between frame 2 and texturing element 7. At this point most of the entrained air between the individual thermoplastic plies has been expelled by reason of the clamping action.

Figure 3:
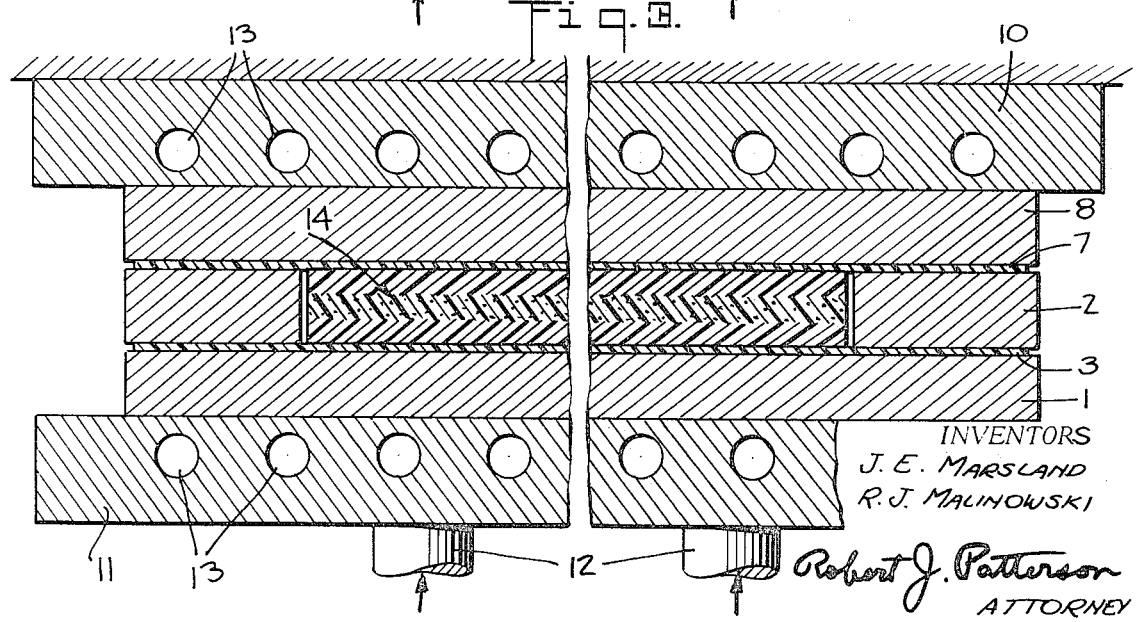
FIG. 3 portrays the step of heating the assembly, while maintaining high platen clamping pressure thereon, to a temperature at which fusion of the thermoplastic material in the plies takes place, fusion bonding of adjacent plies occurs to form an integral thermoplastic mass, and thermal decomposition of the blowing agent is effected.

The assembly is now heated (FIG. 3), while continuing to exert high platen clamping pressure thereon, to a temperature sufficiently elevated and sufficiently maintained to cause fusion of the plies, fusion bonding of adjacent plies to one another, and complete thermal decomposition of the blowing agent. For this purpose platens 10 and 11 are heated in any desired manner, for example by passing high pressure steam (from any suitable source, not shown) through passageways 13 in the platens. Typically, the platens 10 and 11 were preheated prior to the positioning of the assembly between them. As a result of fusion and some lateral flow of the thermoplastic material from which the plies are made the frame 2 is now firmly clamped between plates 1 and 8 and platens 10 and 11 at a clamping pressure so high (ranging from 50 to 200 pounds per square inch of area of the frame, typically being on the order of 140 psi) that frame 2 and confining plates 1 and 8 form a completely closed molding chamber from which it is impossible for any thermoplastic material or gas to escape under the extremely high pressure generated by decomposition of the chemical blowing agent. At the end of this step, as indicated in FIG. 3, the plies of thermoplastic material have fused together at their interfaces to form an integral sheet denoted by reference numeral 14 and the blowing agent in the core plies has decomposed to form gas which is either dissolved in the core thermoplastic or manifested in the form of extremely minute bubbles under very high pressure or both. During the early portion of this step the thermoplastic material flows transversely into the marginal space initially existing between the edges of the stack of plies 4, 5 and 6 and the inner wall of frame 2, and the frame is tightly clamped between plates 1 and 8. The temperature to which the thermoplastic is heated in this stage is above the decomposition temperature of the blowing agent and in the case of azodicarbonamide is generally in the range of from 325° to 400°F.

Figure 4:
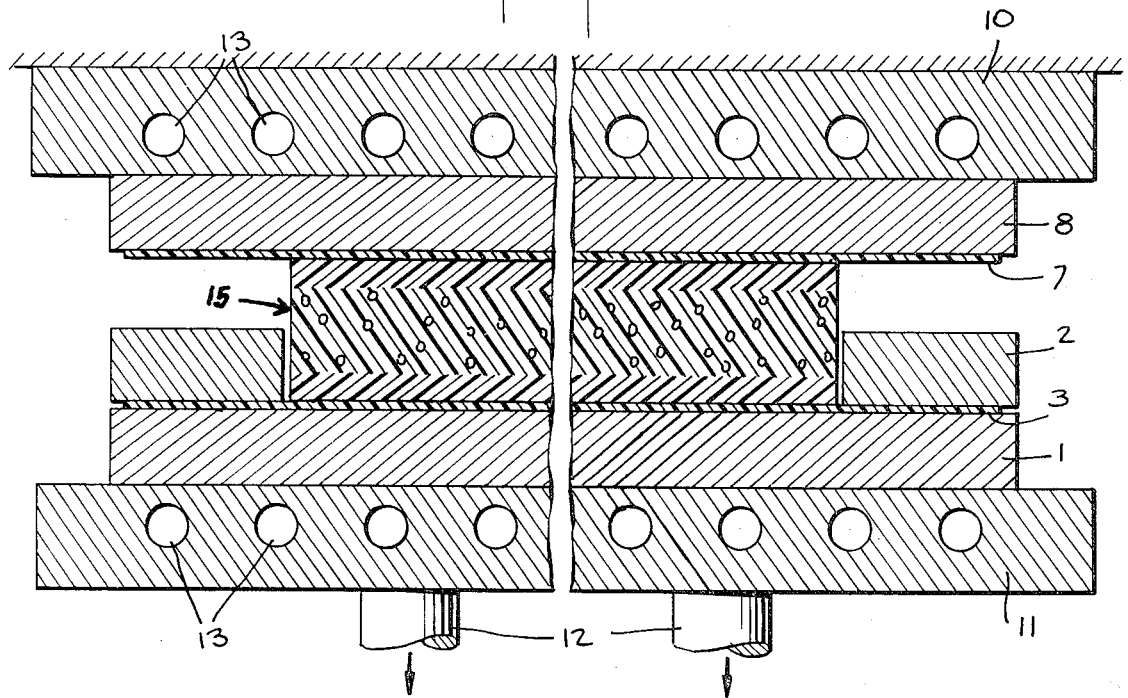
FIG. 4 shows the assembly and equipment during the expansion step while clamping pressure is relieved in a controlled manner so that no "daylight", i.e., free space, occurs between the thermoplastic sheet and the means which confines the sheet, i.e., between the top and bottom surfaces of the laminated plies, and the texture-imparting means, confining plates (if used), and the press platens, at any time during the expansion step.

Upon the conclusion of the steps of fusing the thermoplastic and decomposition of the blowing agent, the clamping pressure exerted on platens 10 and 11 is relieved in a controlled manner and expansion of sheet 14 is carried out as indicated in FIG. 4. This controlled expansion is effected by initially reducing the clamping pressure (Note the downwardly directed arrows on rams 12 in FIG. 4.) to a low pressure, for example less than 10 pounds per square inch of area of sheet 14, preferably less than 1 psi, followed by separation of platens 10 and 11 at a controlled rate. It is important, throughout this expansion step, to maintain intimate positive contacting pressure between the expanding sheet, now indicated as 15, and the opening platens so that in this phase of the process no "daylight" (free space) ever appears in the assembly of the expanding sheet 15, grain plates 3 and 7, confining plates 1 and 8 and press platens 10 and 11. Such maintenance of contacting pressure between the expanding sheet and the opening platens throughout the expansion prevents delamination of the fused layers which would result in a completely unacceptable product.

It is noteworthy that the unique expansion technique used in the present invention and portrayed in FIG. 4 brings about substantially uni-directional expansion, i.e., expansion only in the direction of the thickness of the laminate. This is in distinct contrast to the methods used by prior workers in this art which resulted in less desirable three-dimensional expansion. Three-dimensional expansion is undesirable because of the difficulty of predicting and controlling, within reasonable limits, the lateral dimensions of the expanded sheet. Another advantage of the uni-directional expansion made possible by the present invention is the greater efficiency of utilization of the blowing agent, or conversely the use of less blowing agent to achieve a desired final thickness and a given volume of expanded product.

Figure 5:
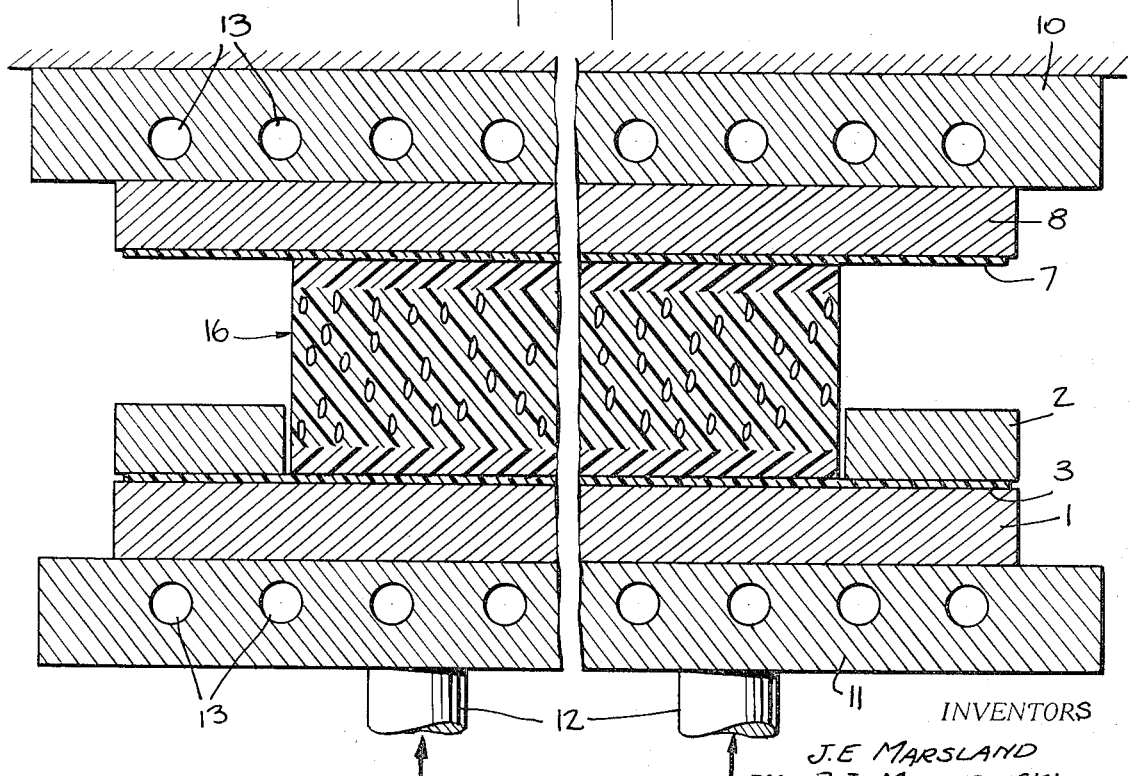
FIG. 5 portrays the assembly and equipment after completion of expansion of the thermoplastic sheet to its final thickness and after the initiation of cooling which is effected while maintaining a fixed platen separation equal to the desired final thickness of the thermoplastic sheet.

FIG. 5 illustrates the dimensional sizing and cooling of the final product 16. After the thermoplastic sheet has attained the desired final thickness at the conclusion of the expansion step, the separation of the platens is halted, the platens are locked as indicated by the arrows on rams 12, and cooling water is introduced into the conduits 13 of platens 10 and 11 to solidify the cell structure of the laminate and stabilize the finished product against distortion upon and after removal by preventing further expansion of the gas in the cells. It has been found that when the product made in this manner is re-heated, for example prior to thermal forming it exhibits substantially no dimensional change. This is highly advantageous in any subsequent thermoforming operation and is in marked contrast to products of this general kind made by prior art techniques using free final expansion.

As will be seen by reference to FIG. 6, in the typical practice of the invention the heating of the press platens by means of steam introduced to conduits 13 is discontinued rather early in the expansion step portrayed in FIG. 4. The residual heat in the thermoplastic sheet and the surrounding equipment suffices to carry the expansion of the sheet to completion.

At the end of the cooling step portrayed in FIG. 5, platen 11 is lowered, the final laminate 16 is removed, and the platens are preheated in preparation for the next cycle.

In the cooling step the product is generally cooled to a temperature below 250°F. If desired, it can be cooled to an even lower temperature, say to below 200°F., to facilitate handling and removal from the equipment. It is important that the product be cooled to a temperature sufficiently low that no delamination occurs.

It is not essential in the practice of the invention that the product have solid or non-expanded faces such as are formed from unexpandable plies 4 and 6. Thus, the product could be made entirely from expandable thermoplastic plies or even from a single expandable thermoplastic layer.

While the invention has been particularly described with reference to making a product having an expanded core and solid faces, the invention can equally be employed for the preparation of a product having a cellular core sandwiched between non-cellular substrate layers which in turn are faced with solid or unexpanded skin layers as shown, for example, in Pooley U.S. Pat. No. 3,206,354. Such skin layers are generally made of material other than ABS resin specially selected to resist deleterious effects such as ultraviolet light, etc.

It will be obvious to those skilled in the art that, if desired, two or more stacks or lay-ups of thermoplastic plies can be processed in a single platen press using a single frame member. For example, one can position two appropriately spaced lay-ups of thermoplastic plies each 42 × 42 inches within a single frame member having an opening 4 × 8 feet and process this assembly in the manner described to obtain two separate expanded sheets slightly (but predictably) greater than 42 × 42 inches. More than two such lay-ups can be positioned within the frame member and processed in accordance with the invention. The lay-ups are spaced far enough from the inner wall of the frame member that the frame member is clamped under full clamping pressure early in the heating step and far enough from one another that merger or coalescence of one with another in the heating step is prevented.

EXAMPLE

An ABS laminate three-fourths of an inch thick and having an expanded ABS core and non-expanded ABS surface faces was made using four plies (each 0.025 inch thick) of expandable ABS core stock sandwiched between eight plies (each 0.025 inch thick) of non-expandable ABS material, in the manner described above. Two lay-ups each 42 × 42 inches were placed within a single frame member having an opening 4 × 8 feet. The clamping pressure on the frame in the stage shown in FIG. 3 of the drawings was about 140 psi. The 30 minute press cycle was as follows:

| Cycle Time (min) | Operation |
|---|---|
| 0 | Press is closed on the total lay-up; the press platens have been preheated to 345°F. and the ram pressure is 2200 psi on 300 in.² of ram area. |
| 6 | Ram pressure is relieved until clamping pressure is less than 1 pound per square inch of sheet area; stock is allowed to expand at the rate of 0.05 in./min. |
| 8 | Steam heat is turned off. Heat in the system completes the expansion. |
| 16 | Expansion is complete with ¾-inch total sheet thickness. Cooling water is turned on. |
| 24 | Cooling is complete, press is opened, and completed laminate is removed. Cooling water is shut off; steam is turned on. |
| 30 | Press is now reheated to 345°F. and cycle is repeated. |

The processing cycle of this example is illustrated graphically in FIG. 6 of the drawings which in the light of the foregoing needs no further explanation except to state that the changes in pressure indicated by the vertical portions of the heavy black line are substantially instantaneous.

ADVANTAGES

It has been found possible, following the above example, to make the 12 ply laminate referred to therein with a specific gravity as low as 0.35. It has also been found possible by following the above teachings to make a product based entirely on expandable material, i.e., without non-expanded faces, having a specific gravity as low as 0.185. The attainment of specific gravities as low as those just mentioned represents a significant advance in the art of making expanded ABS resin sheet products. The expanded product made by the process of the present invention also exhibits significantly greater cell elongation in the thickness direction.

Other important advantages of the method of the invention include:
1. Reduced handling and labor costs.
2. Elimination of use of vulcanizers and of vacuum blankets and associated vacuum pumps.
3. Improved uniformity of thickness and better reproduction of form detail in thermoformed articles (for example engine hood covers which are commonly made with spaced reinforcing ribs formed therein) made from the resulting expanded ABS laminate.
4. Substantial savings in raw materials (more expanded ABS laminate from the same mount of plastic and chemicals).
5. Reduced scrap.
6. Low capital investment for equipment, as illustrated by the fact that equipment for making an expanded sheet 8 feet wide by 40 feet long by the present invention would involve a capital investment less than $200,000.00.

GENERAL

While ABS resin is the thermoplastic material of choice for the expanded core and for the unexpanded facing sheets bonded thereto, the invention is by no means limited to ABS resin. Any other thermoplastic material can be compounded with a chemical blowing agent and used to form the expanded material and any thermoplastic material which is compatible therewith, i.e., which is capable of fusion-bonding thereto to form an integral structure, can be used for the unexpanded facing sheets. Likewise the method of the invention is not limited to making rigid products. For example the technique of the invention could be used to make flexible, semi-rigid or rigid laminates having an expanded polyvinyl chloride core and integrally bonded unblown polyvinyl chloride facing sheets.

Having thus described our invention, what we claim and desire to protect by Letters Patent is:

1. The method of making an expanded thermoplastic polymeric resinous sheet, at least the interior portion of which is expanded, said method comprising:
positioning one or more plies of an unexpanded thermoplastic material within a frame, at least one of said plies containing a solid decomposeable blowing agent for said thermoplastic material and said frame having a thickness less than that of said ply or plies of unexpanded thermoplastic polymeric resinous material and being of a size such that free space is provided between the inner periphery of said frame and the outer periphery of said ply or plies;
placing said frame with said ply or plies positioned therein between upper and lower clamping plate means to provide a stacked assemblage, the area of said clamping plate means being at least equal to the area encompassed by said frame;
clamping sadi stacked assemblage between upper and lower platen press means, said platen press means having an area at least slightly larger than the area of said clamping plate means and at least one of said platens being a driven platen, said clamping exerting sufficient pressure to said stacked assemblage to expel air from said ply or plies and cause said frame to contact only one of said clamping plate means such that expelled air is free to escape from said assemblage through said free space; applying pressure through said plattens to said stacked assemblage causing said frame member to contact both of said clamping plates and completely enclose said ply or plies, and concurrently heating said stacked assemblage, said pressure and said heating being sufficient to fuse said thermoplastic material and decompose said blowing agent, lateral flow of said thermoplastic material being limited by said frame; instantaneously relieving said applied pressure enabling said platens to move apart while concurrently continuing to heat said assemblage to effect vertical expansion of said thermoplastic material, the relief of said pressure being controlled so as to maintain surface-to-surface contact between each of said spaced-apart platens and said clamping plates and between said clamping plates and the expanding thermpolastic polymeric resinous material without permitting any free space to develop within said thermoplastic material, between said expanding thermoplastic material and said clamping plates, and between said clamping plates and said platens during said vertical expansion; cooling said assemblage while retaining said platens in contact with said clamping plates and said clamping plates in contact with said thermoplastic material at the desired final thickness of the expanded thermoplastic material until said thermoplastic material has solidified and stabilized to form an expanded, thermoplastic polymeric resinous sheet; and, removing said expanded thermoplastic polymeric resinous sheet from said assemblage.

2. The method of claim 1 wherein the final sheet is a laminate comprising an interior core portion formed of expanded ABS resinous material and unexpanded thermoplastic polymeric resinous facing sheets integrally bonded to said core portion on each side thereof.

3. The method of claim 1 wherein the final sheet is a laminate comprising an interior core portion formed of expanded ABS resinous material and facing sheets formed of unexpanded ABS resinous material integrally bonded to said core portion on each side thereof.

4. The method of claim 1 wherein said laminate also comprises unexpanded skins formed of thermoplastic polymeric resinous material other than ABS resinous material and integrally bonded to said facing sheets on the outer surfaces thereof.

5. The method of claim 1 wherein said blowing agent is azodicarbonamide, and the expandable thermoplastic material is heated to a temperature of 325°–400°F. in said heating step, and wherein the expanded sheet is cooled to a temperature below 250°F. in said cooling step.

6. The method of making an expanded thermoplastic polymeric resinous sheet having an expanded core portion faced on both sides with a layer of non-expanded thermoplastic polymeric resinous material, each layer of non-expanded thermoplastic material being integrally bonded to the expanded thermoplastic sheet, said method comprising:

positioning one or more plies of expandable thermoplastic polymeric resinous material within a frame, said expandable thermoplastic material being disposed between plies of a non-expandable thermoplastic polymeric resinous material to form a stack of plies of non-expandable and expandable thermoplastic material, at least one ply of said expandable thermoplastic material containing a solid decomposeable blowing agent therefor, said frame having a thickness less than said stack of plies of thermpolastic material and being of a size such that free space is provided between the inner periphery of said frame and the outer periphery of said stack of plies; placing said frame with said stack of plies positioned therein between upper and lower clamping plate means to provide a stacked assemblage, the area of said clamping plate means being at least equal to the area encompassed by said frame; clamping said stacked assemblage between upper and lower platen press means, said platen press means having an area at least slightly larger than the area of said clamping plate means and at least one of said platens being a driven platen, said clamping exerting sufficient pressure to said stacked assemblage to expel air from said stack of plies and cause said frame to contact only one of said clamping plate means such that said expelled air is free to escape from said assemblage through said free space; applying pressure to said stacked assemblage causing said frame member to contact both of said clamping plates and completely enclose said stack of plies, and concurrently heating said stacked assemblage, said pressure and said heating being sufficient to decompose said blowing agent and fuse said non-expandable thermoplastic material to said expandable thermoplastic material and said expandable thermoplastic material to itself, lateral flow of said expandable thermoplastic material being limited by said frame; instantaneously relieving said applied pressure enabling said platnes to move apart while concurrently continuing to heat said assemblage to effect vertical expansion of said expandable thermoplastic material, the relief of said pressure being controlled so as to maintain surface-to-surface contact between said spaced-apart platens and said clamping plates, between said clamping plates and the plies of said non-expandable thermoplastic material, and between the plies of said non-expandable thermoplastic material and the expanding thermoplastic material without permitting any free space to develop within said expanding thermoplastic material, between said expanding thermoplastic material and said non-expandable thermoplastic material, between said non-expandable thermoplastic material and said clamping plates, and between said clamping plates and said platens during said vertical expansion; cooling said assemblage while retaining contact between said platens and said clamping plates, between said clamping plates and said non-expandable thermoplastic material, and between said non-expandable thermoplastic material and said expanded thermoplastic material at the desired, final thickness of the expanded thermoplastic material until said expanded thermoplastic material has solidified and stabilized to form an expanded thermoplastic polymeric resinous sheet; and, removing from said assemblage said expanded thermoplastic polymeric resinous sheet having a layer of non-expandable thermoplastic polymeric resinous material integrally bonded to both faces thereof.

7. The method of claim 6 wherein the final sheet is a laminate comprising an interior core portion formed of expanded ABS resinous material and facing sheets formed of unexpanded ABS resinous material integrally bonded to said core portion on each side thereof.

* * * * *